United States Patent [19]

Colijn et al.

[11] 3,950,587
[45] Apr. 13, 1976

[54] NON-WOVEN TEXTILE FIBER PRODUCTS HAVING A RELIEF-LIKE STRUCTURE

[75] Inventors: Johannes Jakobus Vincent Colijn, Belfaux; Gunter Horst Tesch, Fribourg, both of Switzerland

[73] Assignee: Breveteam, S.A., Fribourg, Switzerland

[22] Filed: May 29, 1974

[21] Appl. No.: 474,152

Related U.S. Application Data

[62] Division of Ser. No. 217,363, Jan. 12, 1972, Pat. No. 3,856,602.

[52] U.S. Cl.............. 428/234; 28/72.2 R; 156/148; 428/255; 428/300; 428/304
[51] Int. Cl.² ........................................ B32B 5/06
[58] Field of Search ......... 161/80, 81, 89, 154, 159, 161/160, 161; 156/148; 28/72.2 R, 72.2 F, 77; 428/234, 255, 300, 304

[56] References Cited
UNITED STATES PATENTS

| | | | |
|---|---|---|---|
| 2,910,763 | 11/1959 | Lauterbach | 28/72.2 R |
| 2,958,113 | 11/1960 | Lauterbach | 28/72.2 R |
| 3,243,861 | 4/1966 | Kumin et al. | 28/72.2 R |

FOREIGN PATENTS OR APPLICATIONS

| | | | |
|---|---|---|---|
| 76,462 | 5/1970 | Germany | 28/72.2 R |
| 1,131,026 | 10/1968 | United Kingdom | 28/72.2 R |
| 1,080,222 | 8/1967 | United Kingdom | 28/72.2 R |

*Primary Examiner*—George F. Lesmes
*Assistant Examiner*—James J. Bell
*Attorney, Agent, or Firm*—Bacon & Thomas

[57] ABSTRACT

A method of producing non-woven, composite fabrics where at least two distinct layers of fibers, one of highly retractable fibers and the other of non-retractable fibers, are superposed into a composite batt; the batt is pattern-needled from the side of the highly retractable fibers, thereby punching portions of these fibers through the other fiber layer so that they protrude as bristles or loops on the other side; whereupon the entire opposite surface of the batt is needled so that the protruding highly retractable fibers are needled back into the batt forming hooks around some of the non-retractable fibers in the line regions of pattern needling. When this felted batt is now heat-treated to induce retraction, the hooks of retracting fibers in the pattern lines contract and close, while the non-retracting fibers in the pattern interstices are laterally compressed and partially raised as a result of the overall area shrinkage on the fabric, thereby creating a three-dimensional boucle-type surface.

8 Claims, 11 Drawing Figures

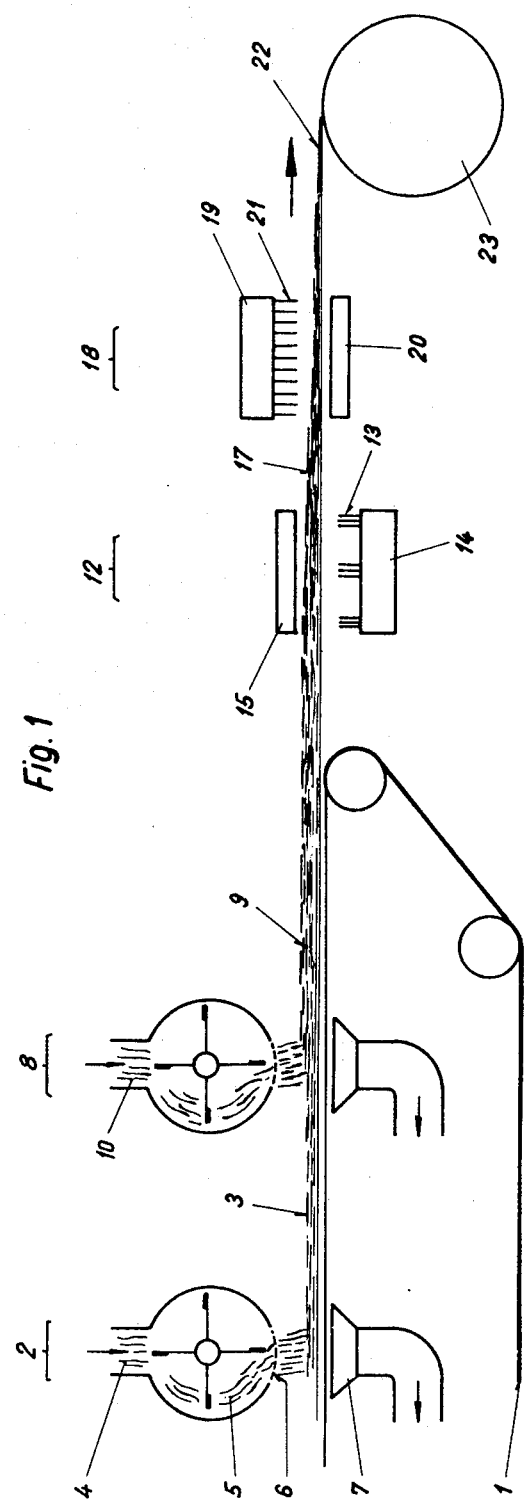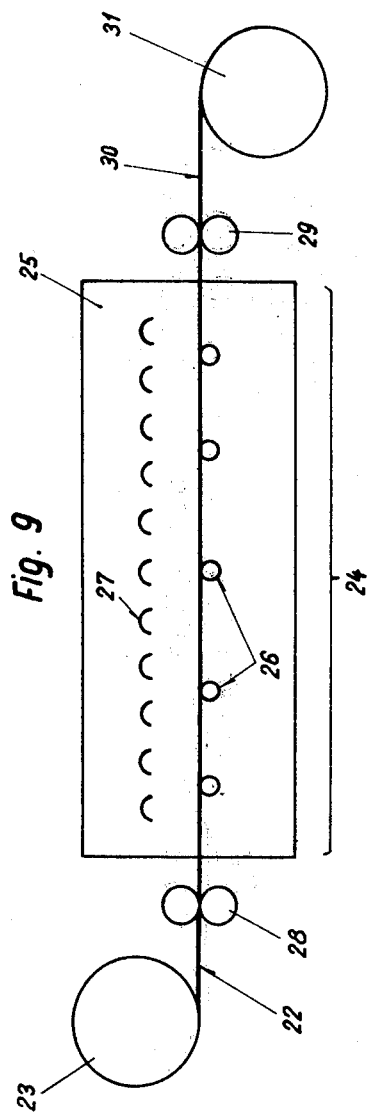

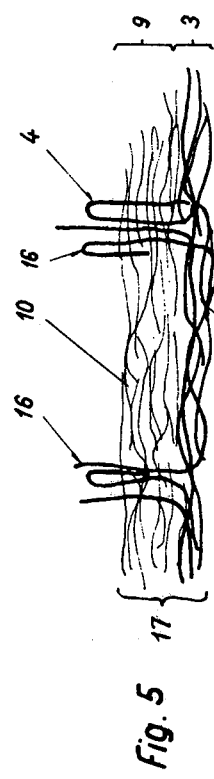
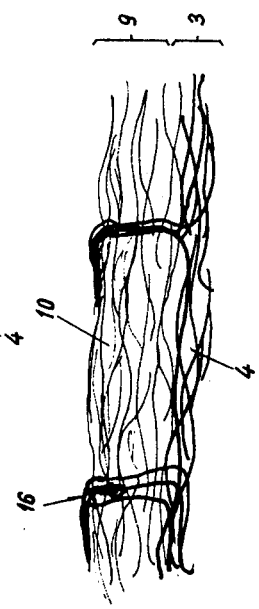
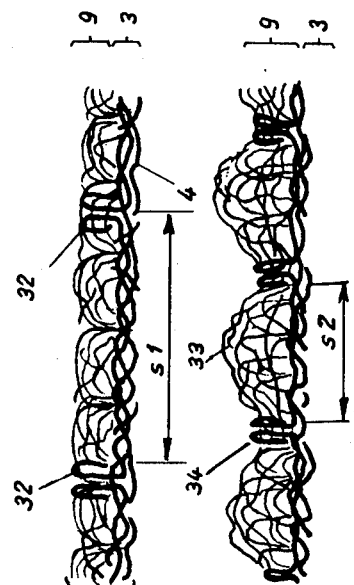
Fig. 5  Fig. 6  Fig. 7  Fig. 8
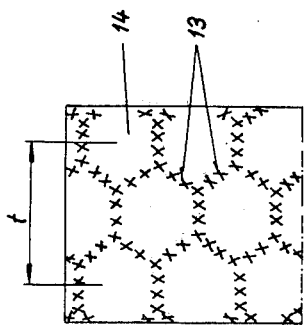
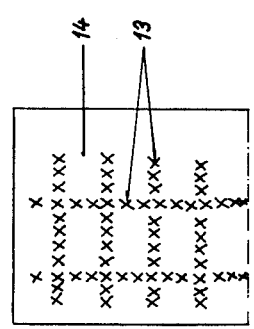
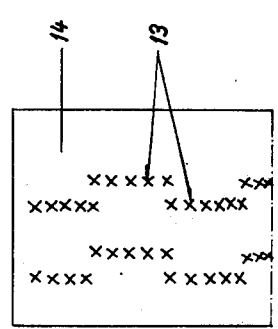
Fig. 2  Fig. 3  Fig. 4

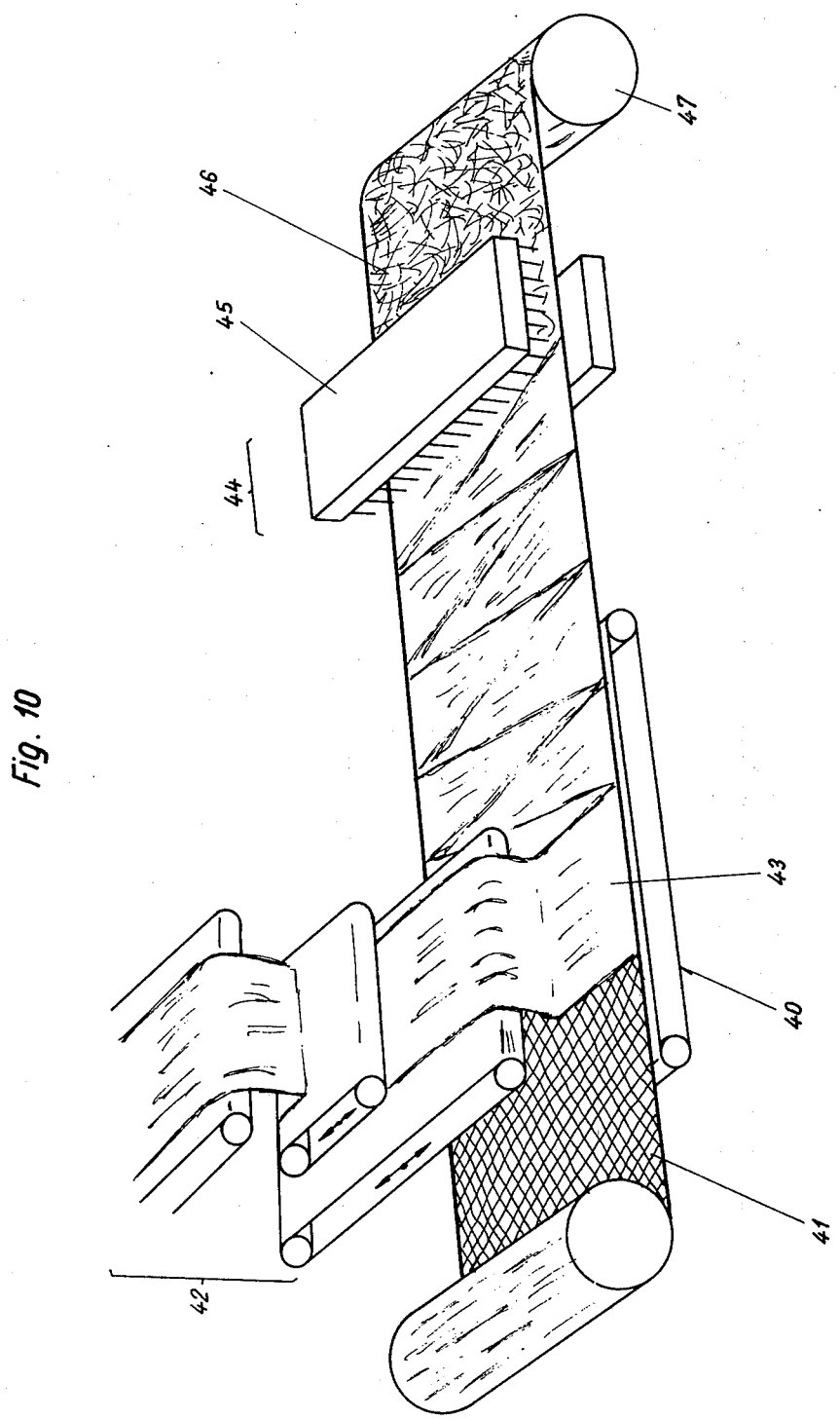

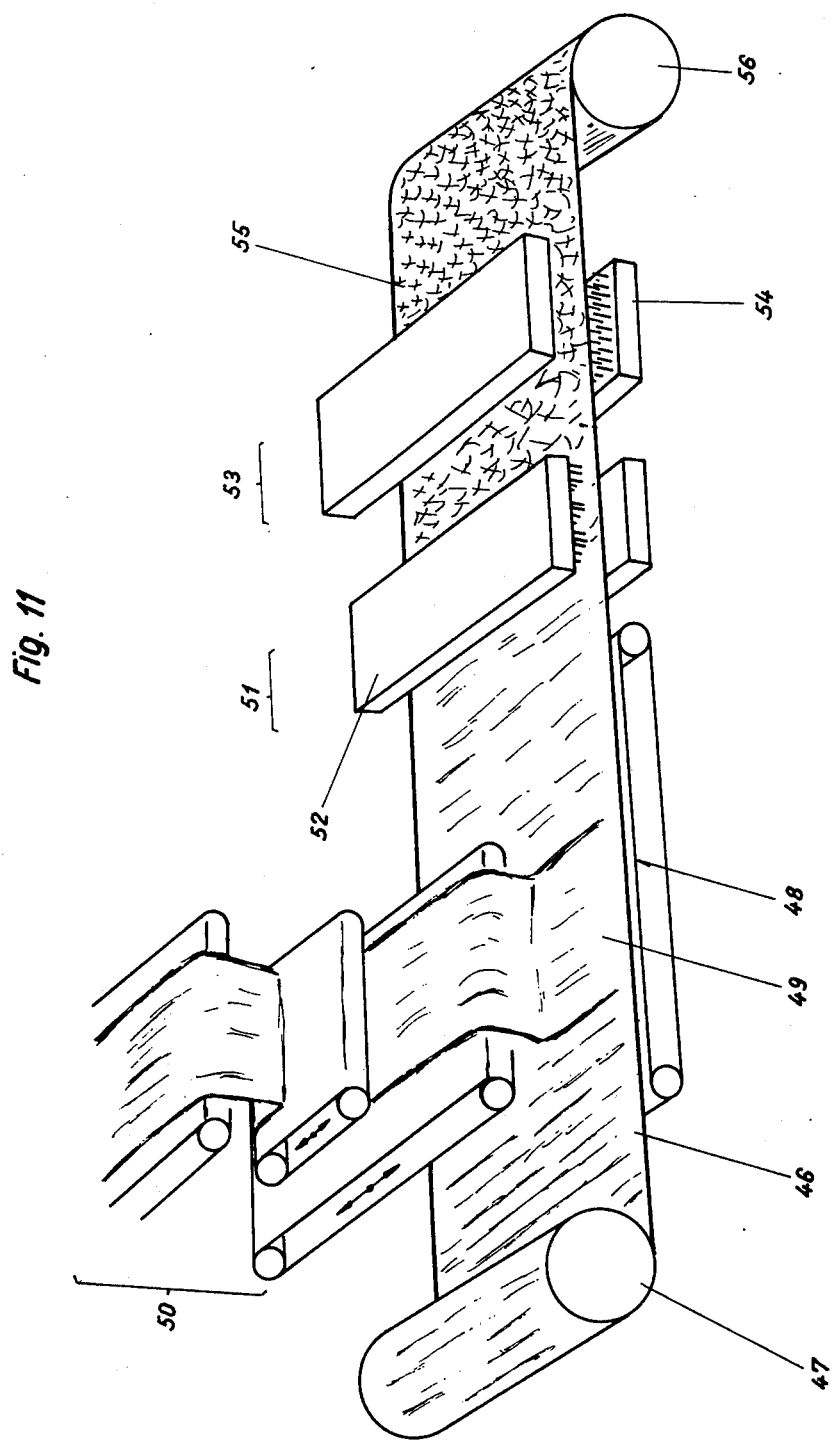

NON-WOVEN TEXTILE FIBER PRODUCTS HAVING A RELIEF-LIKE STRUCTURE

This is a division of application Ser. No. 217,363, filed Jan. 12, 1972 now Pat. No. 3,856,602.

BACKGROUND OF THE INVENTION

1. Field of the Invention

The invention relates to the production of textile fiber products having a relief-like structure. More particularly, it relates to methods of producing non-woven, composite fabrics or fiber fleeces with boucle-type knobs or ridges on their surface by combining several fiber layers in a batt in special needling and retracting operations.

2. Description of the Prior Art

In the art of producing non-woven fabrics it is known to improve the coherence of fiber fleeces by subjecting a needle-punched batt of different fibers to a retracting operation, whereby the retractable fibers, through their shrinking and/or curling, create a mechanical interlock between the fibers. There are now commercially available a variety of retractable synthetic fibers which, at a certain temperature determined by their physical characteristics, undergo a longitudinal retraction of up to 50 percent. Other available fibers are composed of two individual filaments which have different longitudinal retraction ratios (so-called hetero-fibers) so that the retraction treatment results in a curling or crinkling of the fibers. Those retractable fibers are uniformly intermingled with other, non-retractable or less retractable fibers in a batt of fibers; or separate batts of different fibers are superposed on one another and passed through a needle loom, where the fibers of the two batts are comingled and interlaced.

Generally, this kind of fiber batt, when subjected to a retraction treatment, produces a felt-like fleece with a flat surface. It has not been possible in the past to obtain boucle-type knobs or ridges on the product surface with any of the known methods of producing non-woven fabrics. On the other hand, it has already been suggested to produce non-woven fabrics in such a way that a fiber batt of little-retractable fibers is needled through another fiber batt of highly retractable material. The shortening of the highly retractable fibers causes the punched-through tufts of the other fibers to become clamped and retained between the retracted fibers, so that the protruding ends of the clamped tufts can then be transformed by known procedures (brushing, for example) into a fiber pile. It is not an object of the present invention to suggest a method for producing this kind of surface structure.

A different surface structure is obtained with another prior art method where a soft plastic backing is applied to a needled felt batt of retractable fibers. Retraction treatment of the needled felt causes the backing to wrinkle and to pucker. However, because of its closed plastic backing, the end product has unfavorably modified textile characteristics.

Further suggestions concern themselves with the combination of two fiber webs of unequal retraction ratios, using, for example, a highly retractable woven fabric and a fiber fleece of little-retractable fibers and bonding the two webs together, whereby the adhesive is applied selectively with a pattern drum so as to create a line pattern along which the webs are held together. When this laminate is subjected to the retracting treatment, the shrinkage of the retractable fabric causes the non-retracting fiber fleece to fold upwardly between the bond lines. The result are furls or ridge-like folds, depending on the bonding pattern. The surface structure obtained is of the cloque-type, but the end product is not a very durable one, because no bond exists between the upper and lower web layers in the areas between the bond lines. Furthermore, as it is unavoidable in this case that the line pattern of adhesive application becomes visible, the optical impression made by the product is not a very favorable one.

Still further prior art methods call for stitching operations to create particular surface structures and to interlock the layers of the fabric with endless yarns. Apart from a considerable increase in the cost of production, the products obtained by these methods have the disadvantage that any thread breakage during use causes their appearance and value to decline drastically.

SUMMARY OF THE INVENTION

The present invention has as its general objective a method of producing non-woven textile fabrics with a structured, three-dimensional surface by using a suitable combination of needle-felting technology and fiber retraction technology in such a way that the various operations called for do not require either very expensive production equipment or method steps that would slow down the production rate. This problem can be solved by resorting to special needle-punching operations, whereby fibers with a high retraction ratio are interlocked with fibers with a low retraction ratio in such a manner and pattern that a subsequent retraction treatment creates a structured surface on the fabric.

The invention thus suggests a method of producing non-woven, texile fabrics of the fiber fleece type with boucle-type knobs or ridges on the fabric surface by needling together two fiber batts directly or in combination with a carrier web, whereby the fibers of one batt layer have a different retractability than the fibers of the other batt layer; the fibers being deposited in the composite batt in such a way that the fibers, dispersed over the entire surface of each batt layer extend at least in part in approximately the same direction; some of the fibers of the batt layer of highly retractable fibers being needle-punched through the other batt layer in a first needing operation using a special pattern of needles so that the punched-through fibers protrude in the form of loops or bristles from the side which faces away from the needles and that non-needled spaces of at least three millimeters width remain between the needled areas; the composite batt thus needled together being subjected to a second needle-punching operation on the entire batt surface from the side on which the fiber loops or bristles protrude so that the latter are bent over and pushed back into the batt in the manner of clinched staples; the composite, interlocked batt being subjected to a retraction treatment which results in a shrinkage in web area on the one hand, and a shortening of the staple-shaped, highly retractable linking fibers along the pattern lines of the first needling operation, thereby compacting the fabric along these lines and forming boucle-type knobs or ridges in the non-needled spaces between the pattern lines.

BRIEF DESCRIPTION OF THE DRAWINGS

Further special features and advantages of the invention will become apparent from the description following below, when taken together with the accompanying drawings which illustrate, by way of examples, several variations of the method of the invention, represented in the various figures as follows:

FIG. 1 shows, in a schematic representation, a longitudinal, elevational cross-section of a first processing unit as part of a first installation capable of performing the method of the invention;

FIGS. 2 to 4 show, in a simplified layout, three different patterns for the arrangement of the needles in a needle loom;

FIGS. 5 to 8 show, in somewhat simplified cross-sections, the results of several of the method steps on a fiber batt during the performance of the method;

FIG. 9 shows, in a schematic representation, a longitudinal elevation of another processing unit which may be part of the first installation together with the processing unit of FIG. 1;

FIG. 10 shows, in a schematic perspective representation, a first processing unit as part of a second installation capable of performing the method of the invention; and FIG. 11 shows, in a similar schematic representation, a second processing unit following the processing unit of FIG. 10 in the second installation.

DESCRIPTION OF THE PREFERRED EMBODIMENTS

Embodiment No. 1 -- Processing Equipment

In FIG. 1 is shown an endless movable mesh belt 1 which is a part of a conventional machine for producing random-oriented fiber batts. A fiber dispersing device 2 deposits highly retractable fibers 4 on the mesh belt 1 to form a loose batt 3. The fiber dispersing device 2 operates in a known manner according to the turbulence dispersion principle where the fibers 4, after entering a whirling drum 5 through its top opening, are whirled around and intermingled while they leave the drum through a grate 6 above the mesh belt 1 against which they are drawn by suction from a suction chamber 7 arranged underneath the mesh belt 1. The fibers 4 thus deposited in the batt 3 are not oriented in any particular way, but form a random pattern.

A second fiber dispersing device 8 similar to device 2 and arranged behind the latter deposits onto the first batt 4 a second stratum of fibers 10 to form an upper batt layer 9. The fibers 10 of the upper batt layer, however, are of a material which is not, or only barely, retractable in the retracting operation which is to be part of the present invention. It should be noted that this retractability is relative with respect to the treatment of the fibers to which the highly retractable fibers of the first batt layer 3 are to be subjected in the subsequent retracting operation. Commercially available retractable fibers include, for example, fibers of polyvinyl chloride (PVC) or polypropylene (PP), whose longitudinal retraction is approximately 36 percent.

The loosely superposed two-layer batt 3, 9 is then advanced into a conventional needle loom 12 and subjected to a first needling operation. In this operation some of the fibers 4, i.e. fibers of the highly retractable batt layer 3, are punched from below through the upper batt layer 9. The needles 13 on the needle carrier plate 14 therefore must extend from below against the two-layer batt 3, 9, and the matchingly perforated disc plate 15 is in this case positioned above the batt 3, 9.

In FIG. 2 is shown schematically an example of a needle pattern suitable for the needling operation just described. Conventional barbed needles 13 are arranged on the needle plate 14 along the lines of a honeycomb pattern so as to create distinct needling zones. The plate 14 carries enough needles so that each line of a unit of the honeycomb pattern is repeated at least once. The displacement pitch of the two-layer batt 3, 9 past the needle plate 14 between needling strokes is so arranged that subsequent needle penetrations do not exactly match preceding ones but come to be near the latter. Assuming the longitudinal distance between repeating pattern units to be $t$ (see FIG. 2), with $t$ being equal to 12 mm, for example, a preferred width of the needle pattern in the direction of batt advance would be equal to $2t$, or 24 mm, with the batt 3, 9 advancing intermittently after each stroke of the needle loom by an amount somewhat less than $t$, for example by 10 mm.

The needled composite batt 3, 9 obtained after this first, pattern needling operation has areas of unneedled fibers between the needled zones, and these unneedles areas are important for the latter formation of the boucle-type texture on the fabric surface. Experiments have shown that these unneedled areas must have a certain minimal diameter, below which no three-dimensional surface structure is obtained. This minimum diameter is determined by the thickness of the fibers used and is around 3 mm for commonly used fiber materials. Obviously, the pattern in which the punching needles 13 are arranged in the needles plate 14 and the batt advance chosen will determine the character and appearance of the three-dimensional surface structure of the finished product. In FIG. 3 and FIG. 4 are shown two alternative possibilities of creating needle patterns on the needle loom 12. The pattern of FIG. 4 produces short, parallelly staggered ridges, while FIGS. 2 and 3 produce similar results in the form of roundish knobs. It should be understood, of course, that a great variety of different surface patterns can be obtained in this way.

FIG. 5 shows the results obtained by the first needling pass just described. The batt stratum 3 containing the fibers of high retractability forms the lower layer of the two-layer batt 3, 9. For illustration purposes only, the highly retractable fibers 4 are here represented by heavy lines and the non-retractable fibers 10 are shown as thin lines. The barbed needles of the needle loom have pulled several of the retractable fibers 4 through the upper batt stratum 9 so that they protrude from the upper side of the combined batt 17 in the form of either fiber loops 16 or fiber bristles 16. The latter are then flattened against the surface of the combined batt 17, as a result of the further travel of the batt through the installation (FIG. 6). The percentage of fibers of the batt layer 3 which have thus been needled through the upper layer is estimated at about 20 percent.

The pre-needled batt 17 leaving the first needle loom 12 advances to a second, conventional needle loom 18, where it is subjected to a second needling operation. The needle carrier plate 19 of this loom is arranged in the usual location, viz. above the batt 17, with the die plate 20 below it. The barbed needles 21 thus penetrate into the batt 17 from above, i.e from the side from which the fiber bristles 16 protrude.

The arrangement pattern of the barbed needles 21 on the needle plate 19 is the usual random pattern by which a needling effect of even density is obtained. This second needling operation causes the previously flattened fiber bristles 16 to be pushed back into the batt 17 so that the fibers 4 which were needles upwardly through the batt in the earlier pattern-needling operation take now the form of crimped staples 32, each surrounding a bunch of the fibers 10 of the batt layer 9.

The fiber configuration obtained after the second and final needling pass is shown schematically in FIG. 7 as a composite fleece 22. It can now be wound onto a loom 23 for storage.

If one desires to have both needle looms 12 and 18 in the same upright orientation, with the needles penetrating downwardly into the batt, it will be necessary to reverse the sequence of fiber deposition on the mesh belt 1. In this case, the non-retractable fibers 10 are fed to the first fiber dispersing device 8. Between the two needle looms 12 and 18 it will now be necessary to invert the once-needled two-layer batt 17, before the fiber bristles 16 can be needled back into the batt in the second needling operation.

In FIG. 9 is shown schematically a processing station 24 in which the retraction treatment takes place. The boom 23 with the needled fiber felt 22 is placed on one end of the retracting station 24. The latter includes such known equipment as a heat chamber 25, with support rollers 26 and a heat source 27 inside the chamber. The retraction station includes control means to determine the shrinkage in overall width of the fabric under the influence of the retraction temperature. Separate adjustment of the speeds of input and output at the input rollers 28 and at the output rollers 29 provides for a control of the longitudinal shrinkage of the fabric 22. The heat source may be provided in one of several different forms; FIG. 9 indicates schematically a bank of radiant heaters 27 as one possibility. A more even temperature distribution is obtained by using instead a recirculating heat carrier medium, such as hot air or hot water, for example. Steam heat is likewise suitable for this purpose.

The fully retracted finished product 30 is again wound onto a boom 31 for storage.

FIGS. 7 and 8 show in more detail how the retraction treatment affects the internal and external configuration of the needle fleece 22 as it becomes the end product 30. Both figures are drawn to about the same scale. The fibers 4 of the batt layer 3, when heat-treated, produce an area shrinkage of approximately 30 to 35 percent, which is indicated by a shortening of the initial distance $s1$ (FIG. 7) to $s2$ (FIG. 8) after retraction. The same retraction also causes the twice-needled, staple-shaped fibers 32 to shorten and to close at 34, thereby firmly tying the batt layer 9 to the layer 3 along the lines created by the pattern needling operation. The area shrinkage resulting from the retraction of the fibers 4 in the layer 3 also causes the non-retractable fibers 10 of the batt layer 9 to be laterally compressed so that they loop upwardly to form boucle-type knobs or ridges 33 on the upper side of the end product. The pinching effect caused by the tying fibers 34 along the pattern lines produces a very pronounced three-dimensional surface structure. It therefore gives the fabric improved durability, because its knobs or ridges 33 are packed very closely. Under use, the surface structure remains intact for a long time, so that the longevity of this kind of fabric is considerably higher than that of similar, structured needle-felt products produced from the identical fiber materials by prior art methods. The densely packed fiber fabrics produced by the proposed new method have the additional advantage over prior art products that dust cannot penetrate as easily into the fabric.

In a minor modification of Embodiment No. 1 described above, the batt layer 9 containing the non-retractable fibers 10 is deposited separately on a mesh belt and passed through a pre-needling operation in a needle loom similar to needle loom 18, whereupon it is deposited onto the batt layer 3 with the fiber bristles of the pre-needled batt layer 9 extending downwardly into layer 3. The remaining method steps are the same as those previously described.

As far as the formation of the earlier-mentioned surface knobs or ridges in the retraction operation is concerned, it was found that optimal results are obtained, when the fiber orientation in both batt layers 3 and 9 is approximately the same. On the other hand, the desired effect is almost non-existant, when the fibers in each layer are deposited in parallel alignment, but the batt layers are superposed in such a way that the directions of fiber orientation in the two layers are perpendicular to one another. As a general rule, it can be said therefore, that fibers distributed over the entire area of each batt layer should at least in part extend in the same direction. This condition is always met if one of the two batt layers is deposited with a random orientation of the fibers. This assures that at any one point of the batt there will be fibers that have at least a portion of their length aligned in parallel with the fibers of the other batt layer.

Example No. 1 -- Materials

The following combination of materials is suitable for an example of application of the method of Embodiment No. 1, described earlier. It concerns itself with the manufacture of a fabric which may be used as a cover fabric for upholstery and as a wall covering material.

Fiber material of high retractability: PVC fibers, 5.6 dtex, staple length 60 mm, longitudinal retraction at 110°-120°C: approximately 36% (increase in cross section approximately 17%).

Fiber material of low retractability: PAC fibers (polyacrylonitrile), 8 den., staple length 65 mm.

The non-retractable PAC-fibers were deposited in a random dispersion batt of 100 g/m² unit area weight and pre-felted in a needle loom with random needle pattern in 60 penetrations per cm², with a penetration depth of 15 mm.

The retractable PVC fibers were deposited in a random dispersion batt of 60 g/m² as a first batt layer on the mesh belt 1. The pre-felted batt of PAC-fibers was then superposed onto the PVC fiber batt as a second layer.

The two-layer batt was then pattern-needled from below in the needle loom 12 (FIG. 1), the needle pattern being the honeycomb-type of FIG. 2; penetration depth 23 mm.

The final needling operation in the needle loom 18 was done from above with 50 penetrations per cm², at a depth of 12 mm. The felted batt was finally put through a retracting treatment in a steam-heated retraction chamber, at a temperature of 110°-120°C, exposure time 10 minutes. The shrinkage measured on the end product was approximately 23 percent in the longitudinal and in the transverse directions.

Embodiment No. 2 -- Processing Equipment

As is schematically illustrated in FIG. 10, a web of thermoplastic synthetic netting 41 is moved over a conveyor table 40, where a previously formed, carded fiber batt 43 of non-retractable fibers is deposited on the netting 41 by means of a transverse ply-laying device 42. The transverse plies are deposited as several layers having an angle of approximately 11° to the transverse axis of the batt.

The fiber batt 43 then moves through a needle loom 44 where it is needle-punched onto the netting web in a conventional way. The needle plate 45 of the loom 44 has the usual random needle pattern. The thusly pre-felted batt 46, reinforced by the netting is wound onto a boom 47 for storage.

On a second processing unit shown in FIG. 11 the full boom 47 feeds the pre-felted batt 46 to another conveyor table 48. The batt 46 is preferably so oriented that the bristles of the previous pre-felting operation are now on the upper side of the batt 46. Onto this batt is now deposited a second batt layer 49 using again a transverse ply-laying device 50 in the manner described earlier. This upper batt layer 49 consists of highly retractable fibers. In a patterned needle-punching operation in the needle loom 51 the upper batt layer 49 is needled into the combined netting web and lower batt layer 46. The needle plate 52 of the loom 51 has again a needle pattern along distinct lines, such as the honeycomb pattern of FIG. 2. The resulting composite batt 55 is now advanced to another needle loom 53 which has a needle plate 54 with the usual random needle pattern.

In FIG. 11 the second needle loom 53 is shown immediately behind the first needle loom 51 to simplify their representation. Such an arrangement is possible, but it requires that the needle plate 54 of loom 53 is arranged underneath the batt and that the needles penetrate upwardly. However, it may be more desirable to use as the second needle loom a conventional, downward-punching loom. In this case it will be necessary to space the two needle looms further apart and to invert the composite batt on the way from the loom 51 to the loom 53.

The fully felted composite fleece 55 is again wound onto a boom 56. It can now be subjected to the retraction treatment which was described earlier.

In order to produce heavier fabrics, one may add a dispersion adhesive to the lower side of the composite fleece 55, i.e. to the side on which the highly retractable fiber layer has been added. The dispersion agent is later expelled in a first section of the heat chamber, while the fleece is heated to the retraction temperature in the remaining portion of the heat chamber. Longitudinal and transverse shrinkage are again controlled in the earlier-described manner.

The method of the invention can be extended by further processing the composite fleece 55 after the retraction treatment in the heat chamber, whereby the underside of the fabric is impregnated with a thermoplastic fiber bonding agent (hot melt adhesive) or whereby an additional layer of material is applied to the underside of the fabric. These additional layers are preferably cushioning layers of fleece, foam rubber, and the like.

Example No. 2 -- Materials

In this example of applying Embodiment No. 2 of the invention, the end product is one that may be used as a floor covering material. The materials to be combined are as follows.

The fiber batt 43 is of non-retractable polyamide fibers, 20 den., staple length 100 mm, batt weight 600 g/m$^2$. It is needled onto a netting web of polyethylene of 180 g/m$^2$, using 80 needle penetrations per cm$^2$, at a penetration depth of 17 mm.

The second fiber batt 49 is of retractable polypropylene fibers, longitudinal retraction approximately 32% at 145°C±2°C (data from supplier), 15 den, staple length 90 mm. Batt 49 is pattern-needled onto the first batt 43 with a needle penetration of 29 mm. The composite fiber batt is subjected to a final random needling operation at 80 penetrations per cm$^2$, with a penetration depth of 17 mm.

The fleece is treated for retraction in a heat chamber at ambient temperatures ranging from 135°C to 150°C, preferably at 145°C±2°C, using a tentering frame. Longitudinal shrinkage of the fabric is prevented by pulling the fabric from the chamber at the same rate at which it is fed into the chamber. The transverse shrinkage obtained is 35 percent.

At the ambient treatment temperature of 135°–150°C the material of the thermoplastic synthetic netting 41 sandwiched between the batt layers becomes soft. The retraction of the fibers having caused a plastic deformation of the netting 41, the deformation thus becomes permanently set after re-hardening of the netting, giving the finished product an improved dimensional stability.

Other Embodiments and Examples of Material Combination

In a modification of Embodiment No. 1, a retractable layer of a woven fabric of retractable fibers or of stretched synthetic netting may be sandwiched between the two fiber layers 3 and 9, and the layers are then needled together. This woven fabric or synthetic netting acts as a filler and also undergoes retraction during the retraction treatment. Thus, the netting can replace a portion of the expensive retractable fiber material.

In a minor modification of the Embodiment No. 2 the transverse plylaying device 50 of FIG. 11 deposits a random fiber batt of non-retractable PAC-fibers directly onto the conveyor table 48. A second, similar ply-laying device behind device 50 deposits another batt layer of non-retractable fibers onto the first layer. This second layer will not be exposed at the upper side of the end product and its fibers can therefore be of a less expensive material. This two-layer batt is then covered by a carrier web of non-retractable material such as foam rubber or a netting web of thermoplastic material. The top layer is again a stratum of highly retractable PP-fibers.

The various needling operations are again performed in a single passage as illustrated in FIG. 11, the first needling operation in loom 51 with the patterned needle plate 52 and the second needling operation from below in loom 53 with a random needle plate 54.

The needled material is then further processed as described under Example No. 2.

As a further alternative, it is possible to replace the batt layer of highly retractable fibers by several layers of superposed split webs. The latter are highly stretched, retractable webs of synthetic material which, when they are pierced by the needles of the needle loom break up into numerous fibrilles. These highly stretched fibrilles undergo considerable retraction during retraction treatment so that they serve the same purpose as the retractable fibers.

A still further possibility of a retractable batt layer consists in using similarly stretched synthetic netting webs. These webs can be needle-punched along pattern lines, by using a needle loom with a needle beam having a single row of needles, the normal barbed needles being replaced by spike needles, i.e. needles whose point is split in the shape of a "Y".

What is claimed is:

1. A non-woven textile fabric with a three-dimensional upper surface in the form of boucle-type knobs or ridges, comprising in combination:
   a. at least two distinct upper and lower layers composed of at least two kinds of fibers of unequal retractability relative to a determined retraction treatment; the two layers being superposed and needled together by at least two needling operations, the fibers of higher retractability being substantially in the lower layer;
   b. fibers of higher retractability in the lower layer of the batt having portions of their lengths needled upwardly entirely through the batt thickness, the ends of said portions being folded back into the upper surface of the batt to form tight hooks around bunches of fibers of lower retractability in the upper layer of the batt, these hook-shaped fiber portions being concentrated within the narrow line regions of a regular needling line pattern so as to define hook-free surface areas therebetween;
   c. the fibers of higher retractability in the lower layer including said portions of their lengths formed into hooks being in retracted condition induced by a retraction treatment of the fabric subsequent to the forming of said hooks and acting selectively on said fibers of higher retractability, the hook-shaped portions of the retracted fibers exerting a vertical compression on said bunches of unretracted fibers in the upper layer within said line regions in the manner of seams, the retracted fibers of the lower layer of the batt maintaining the compressed line regions at such a reduced mutual horizontal distance relative to an original needling horizontal distance that the unretracted fibers located in the hook-free areas above the lower layer are horizontally compressed and raised to form boucle-type knobs or ridges at the upper surface.

2. A non-woven fabric as defined in claim 1, wherein the hook-free areas between the needling pattern lines have a diameter of at least 3mm.

3. A non-woven fabric as defined in claim 1, wherein the composite batt includes a carrier and filler web layer between two batt layers, said web layer being an open mesh material.

4. A non-woven fabric as defined in claim 3, wherein the carrier and filler web between the batt layers is of a retractable material, said material retracting under the same retraction treatment conditions as the retractable fibers of the bottom layer.

5. A non-woven fabric as defined in claim 3, wherein the carrier web between the batt layers is a web of foam rubber.

6. A non-woven fabric as defined in claim 3, wherein the carrier and filler web between the batt layers if of a material which is normally relatively rigid, but which, under the retraction treatment conditions for the retractable fibers, becomes relatively soft without retracting.

7. A non-woven fabric as defined in claim 6, wherein the carrier web between the batt layers is a reticular web of synthetic thermoplastic material.

8. A non-woven fabric as defined in claim 1, further including a middle filler layer of fibers between the bottom layer of retractable fibers and the top layer of non-retractable fibers, the fibers of the middle filler layer being of a non-retractable material which is less valuable than the fiber material of the top layer.

* * * * *